(12) United States Patent
Fourrey et al.

(10) Patent No.: US 6,648,392 B2
(45) Date of Patent: Nov. 18, 2003

(54) MODULAR SEAT LAYOUT SYSTEM FOR AN AUTOMOBILE VEHICLE

(75) Inventors: François Fourrey, Corquilleroy (FR); Jean-François Pierrey, Bourg la Reine (FR); François Senseby, Chatenay-Malabry (FR); Frédéric Baret, Dourdan (FR)

(73) Assignee: Faurecia Sieges d'Automobile S.A., Boulogne (FR)

( * ) Notice: Subject to any disclaimer, the term of this patent is extended or adjusted under 35 U.S.C. 154(b) by 131 days.

(21) Appl. No.: 09/780,563

(22) Filed: Feb. 12, 2001

(65) Prior Publication Data

US 2001/0050501 A1 Dec. 13, 2001

(30) Foreign Application Priority Data

Feb. 10, 2000 (FR) .............................. 00 01630

(51) Int. Cl.⁷ ................................. B60N 2/02
(52) U.S. Cl. .................... 296/65.09; 297/331; 297/236; 297/235
(58) Field of Search ................ 297/234, 235, 297/236, 237, 240, 243, 334, 331, 335, 378.1; 296/65.01, 65.05, 65.09, 65.16

(56) References Cited

U.S. PATENT DOCUMENTS

| 268,519 | A | * | 12/1882 | Moore |
| 299,437 | A | * | 5/1884 | Stratton |
| 334,905 | A | * | 1/1886 | Shuler |
| 653,511 | A | * | 7/1900 | Hyatt et al. |
| 6,193,317 | B1 | * | 2/2001 | Mitschelen et al. |

FOREIGN PATENT DOCUMENTS

| FR | 2536349 | 5/1984 |
| FR | 2572340 | 5/1986 |
| FR | 2575708 | 7/1986 |
| FR | 2589800 | 5/1987 |

* cited by examiner

Primary Examiner—Milton Nelson, Jr.
(74) Attorney, Agent, or Firm—Connolly Bove Lodge & Hutz LLP

(57) ABSTRACT

A modular seat layout system in an automobile vehicle, especially of the type including three rows of seats, including at least two seats located one behind the other. The rear seat is attached to the floor of the vehicle by a first linkage so that the seat pan of the rear seat can translate forward to be housed, in a forward position, in a space provided for this purpose below the location which is occupied by the seat pan of the front seat in the normal utilization position of the said front seat.

11 Claims, 6 Drawing Sheets

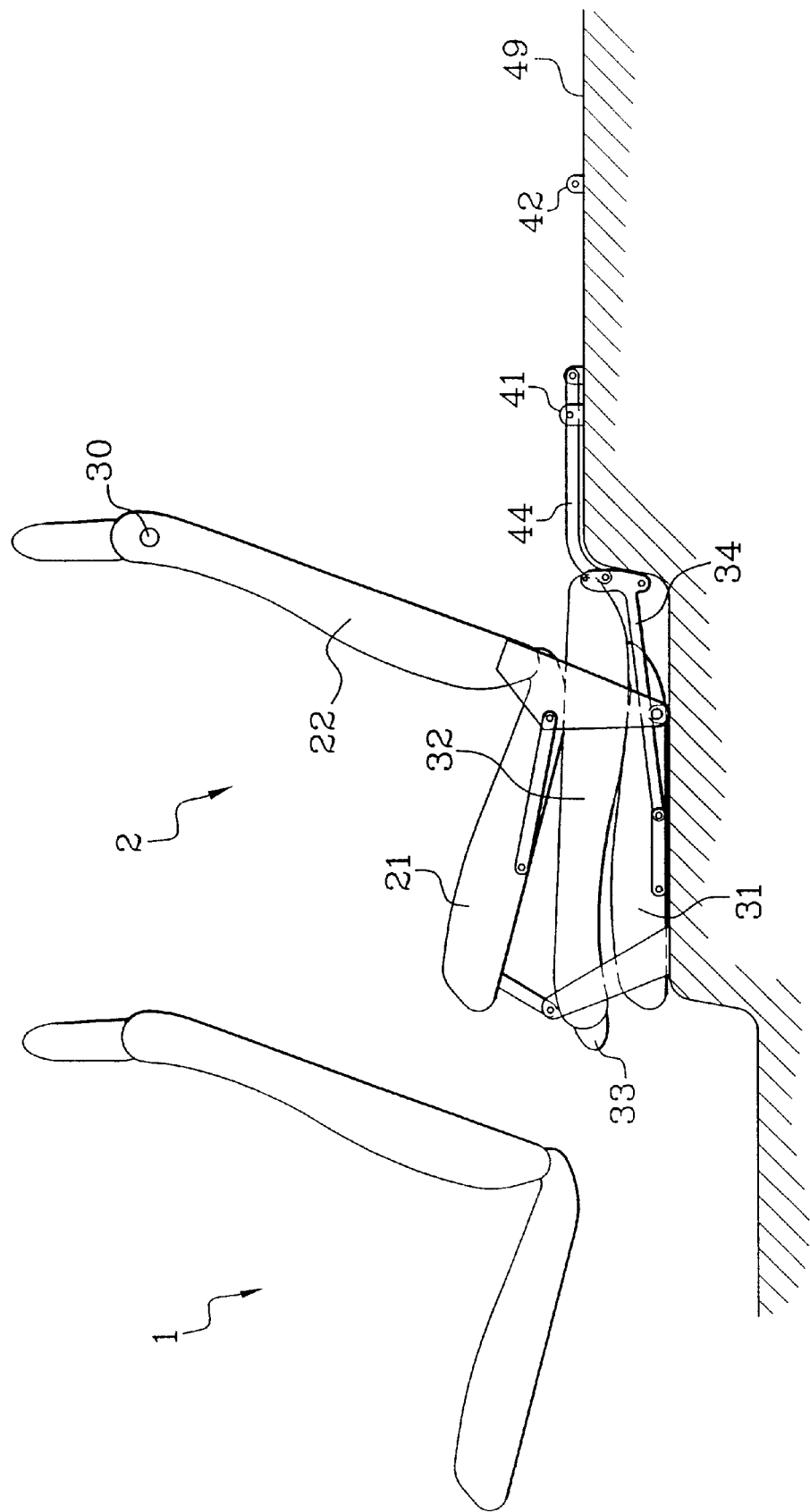

MODULAR SEAT LAYOUT SYSTEM FOR AN AUTOMOBILE VEHICLE

FIELD OF THE INVENTION

This invention concerns a modular seat layout system for an automobile vehicle, this system concerning seats placed one behind each other in the normal utilization position of the said seats and, in particular, the seats of the second and third rows in a vehicle of the type currently called a people carrier with three rows of seats.

BACKGROUND OF THE INVENTION

In this type of vehicle, maximum modularity is conventionally sought in the layout of the seats either so that they can be arranged to provide maximum comfort for the users or to obtain maximum load-carrying space if all seats are not used. To meet these expectations, a well-known solution consists in using seats fixed in a removable manner to the floor of the vehicle which can be removed from the passenger compartment upon request to increase the load-carrying volume. Again, currently, several attachment positions are provided on the floor to allow the layout to be adapted to suit the users' requirements. A disadvantage is that the seat thus removed must be stored and therefore requires a place for this purpose, for instance in the vehicle owner's garage. In addition, it is in general necessary to return to the place where the seat was removed to be able to reinstall it and again provide a seat for a passenger.

For various types of vehicles, it has already been proposed to attach the seats to the vehicle while allowing maximum load-carrying space to be freed without the need to remove the seat from the passenger compartment. Various solutions are currently used in conventional-type saloon cars which consist, in general, in folding the rear seat, either in full or only over a part of its width, against the rear of the backrest of the front seats. Often, for instance, the seat pan of the rear seat is raised towards the front seat and the rear backrest is folded down against the floor to take the place of the seat pan. The volume of the trunk is thus considerably increased and the rear face of the backrest thus folded down extends the load-carrying floor space of the trunk.

In other systems, such as, for instance, the one described in document FR-A-2589800, the seat pan is raised as described above and the rear backrest, hinged on the seat pan, is also placed, resting more or less vertically, behind the raised seat pan and the front seat. The seat displacement kinematics are obtained by a set of hinged links connecting the floor of the vehicle, the seat pan and the backrest of the seat. In this system, with the seat pan in normal utilization position, the backrest of the rear seat can also be pivoted towards the rear to a more or less horizontal position to form, with the seat pan, a bunk.

In people carrier-type vehicles, the removable seats are also frequently foldable, for instance, the backrest can be folded onto the seat pan and the whole can then be tilted forwards by pivoting around an axis located more or less level with the front of the seat pan. In this folded position, the seat nevertheless takes up a space which is not negligible.

The aim of this invention is to propose another solution for the layout of the seats in the passenger compartment of a car, especially the seats of the second and third rows, which allows the load-carrying space to be modulated as best as possible to suit requirements without the need to remove the seats from the passenger compartment. The invention aims also in conserving maximum utilization possibility of the seats by keeping them attached to the vehicle and therefore liable to be returned to normal utilization position as soon as the unloading of the trunk permits this. The invention also aims at offering highest possible modularity by authorizing various folding arrangements for each seat, adaptable to requirements, and ensuring a trunk load-carrying floor level as low as possible. Lastly, the invention also aims at allowing these changes in layout to be made by simple operations.

With these targets in mind, the subject of the invention is a modular seat layout system in an automobile vehicle including at least two seats located one behind the other, that is one seat that will be designated the front seat and the other seat that will be designated the rear seat.

According to the invention, this system is characterized in that the rear seat is attached to the floor of the vehicle by a first set of hinged items so that the seat pan of the rear seat can be translated towards the front to be housed, in a forward position, in a space provided for this purpose below the space which is occupied by the seat pan of the front seat in the normal utilization position of the said front seat and in that the front seat is attached to the floor of the vehicle by a second set of hinged items arranged so that the said front seat can be folded away towards the front to allow the seat pan of the rear seat to be brought to its said forward position and then replace the front seat in its normal utilization position.

It is now specified that the designations front and rear are relative when applied to the two seats mentioned in the definition of the invention above. For instance, in a vehicle with three rows of seats, for which the invention is especially but not exclusively intended, the rear seat is a seat of the third row, the seat that is called here the front seat is a seat of the second row and the seats located furthest forward will be called the seats of the first row.

The system according to the invention thus allows, thanks to discerning use of the space available or which can be made available under the front seat to house the seat pan of the rear seat, in fact the elimination of all obstructions in the trunk which would be due to the volume of the seat pan and therefore finally an increase in the load-carrying volume available in the trunk. In addition, the invention allows this gain in load-carrying volume to be obtained while conserving all the seats in the passenger compartment and also by conserving the possibility of normal use of the front seats. In other words, in the case of a vehicle with three rows of seats as targeted essentially by the in invention, normal use of the seats of the second row will be possible while obtaining a substantial gain in space in the trunk and this without removing the rear seats. For instance, this can especially enable all the seats in the vehicle to again be made available when a bulky object which justified the temporary increase in the volume of the trunk is unloaded.

The fact that the front seat can be folded away towards the front facilitates the forward movement of the seat pan of the rear seat before being placed above the front seat in the normal front seat utilization position.

According to a first possible arrangement, when the seat pan of the rear seat is in its forward position and the front seat is in its normal utilization position, its seat pan being located above the seat pan of the rear seat in forward position, the backrest of the rear seat is located just behind the backrest of the front seat and more or less parallel to the latter. This arrangement is especially suitable for cases where the space available under the seat pan of the front seat is relatively limited. In this arrangement, after the seat pan of the rear seat has been placed in its forward position and the front seat returned to its normal utilization position, the backrest of the rear seat takes up therefore only a small amount of space in the trunk behind the backrest of the front seat, this space being limited to the thickness of the rear backrest as the two backrests are more or less parallel. The space taken up by the backrest of the rear seat can be minimised by making the shape of the rear of the front backrest match the shape of the front face of the rear backrest so that they will mate with each other as best as possible.

According to a preferential arrangement, the backrest of the rear seat is installed so as to pivot in relation to the seat pan of the rear seat so that, when the seat pan of the rear seat is in its forward position, the backrest of the rear seat can be housed, in a position where it is folded onto the said seat pan, below the location which is occupied by the seat pan of the front seat in the normal utilization position of the said front seat. In this case, the complete rear seat can thus be folded away in the space available under the seat pan of the front seat optimizing still further the volume of the trunk in relation to the previous case while still conserving normal utilization of the front seat.

Preferentially again, in the position where the rear backrest is folded onto the seat pan of the rear seat in forward position, the rear face of the rear backrest is more or less in line with and extends the vehicle's trunk load-carrying surface.

It is thus possible to free a maximum load-carrying floor surface more or less continuous over the complete surface without changes in level, by using the rear face of the backrest as floor and by maintaining the front seat as far as possible towards the front of the vehicle.

Again, preferentially, for this purpose, the front seat is attached to the floor of the vehicle by a second set of hinged items arranged so that the seat pan of the front seat can be raised more or less to the vertical by pivoting forwards and the backrest of the front seat can be translated to place it behind the thus raised seat pan. It is then possible, in a vehicle with three rows of seats, to obtain maximum trunk volume without removing the seats, only the combined thickness of the raised seat pan and the backrest of the seat of the second row reduces the length of the trunk from the rear of the vehicle up to the seats of the front row.

According to other technological arrangements of the design according to the invention, especially adapted to obtain the kinematics required for the various arrangements mentioned above while ensuring simple and rapid operation:

the first set of hinged items, for the rear seat, includes:
  a main arm which extends more or less horizontally and which has a rear end forming a head on which the backrest is installed, and a front end attached to the seat pan by a leg link hinged in relation to the arm and in relation to the seat pan,
  a pivoting lever the first end of which is hinged to the floor of the vehicle and the second end of which is hinged to the head of the main arm.
the system includes disconnectable anchoring means to connect in a separable manner the two ends of the main arm to the floor of the vehicle which ensures that the seat is firmly held on the floor in all cases when the seat can accommodate a user,
the backrest of the rear seat is installed so as to. pivot on the head of the main arm to allow the backrest to be folded onto the seat pan and the system includes disconnectable locking means to connect the top of the backrest of the rear seat to the body of the vehicle to maintain the backrest in raised position when the seat is in utilization position,
alternatively, the backrest of the rear seat can be attached to the head of the main arm by a lockable hinge mechanism, of a known type, which also allows the backrest to be folded onto the seat and the backrest to be firmly held in utilization position, raised and locked,
the second set of hinged items, for the front seat, includes:
  a front seat pan support, fixed and attached to the floor, on which the front of the seat pan of the front seat is hinged,
  a rear leg on the upper end of which is installed the backrest of the front seat, which is attached to the seat pan by a pivoting link hinged on the leg and on the seat pan in the center longitudinal part of this, this system allowing the seat pan to be raised simultaneously with the movement of the backrest, therefore requiring a single operation to bring the seat of the second row against the backrest of the seat of the first row.
the system includes disconnectable anchoring means to connect in a separable manner the lower end of the rear leg to the floor of the vehicle to ensure rigid attachment of the seat to the floor in all cases when it can accommodate a passenger.

Other characteristics and advantages of the invention will appear in the description which will follow of a layout, in compliance with the invention, of the seats of the second and third rows of a car with three rows of seats.

BRIEF DESCRIPTION OF THE FIGURES

Refer to the appended drawings on which:

FIG. 6 is a view of the same seats in a third variant of the final layout, obtained from the position of the second variant, where the seat of the second row is replaced in normal utilization position, over the rear seat folded down over itself.

DETAILED DESCRIPTION OF THE INVENTION

Figure 1:
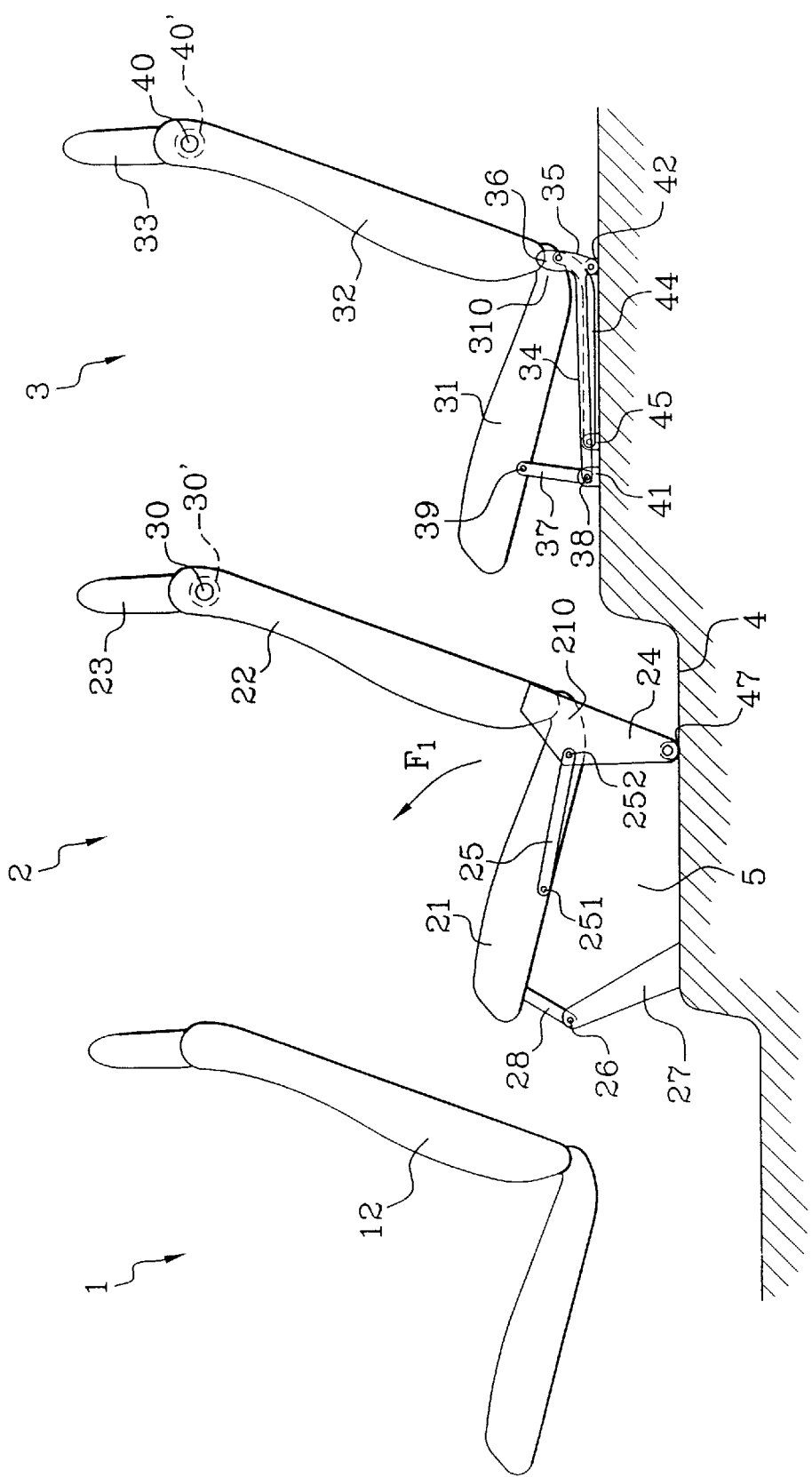
FIG. 1 is a schematic view showing the arrangement of three rows of seats, all seats being in passenger utilization position.
Figure 2:
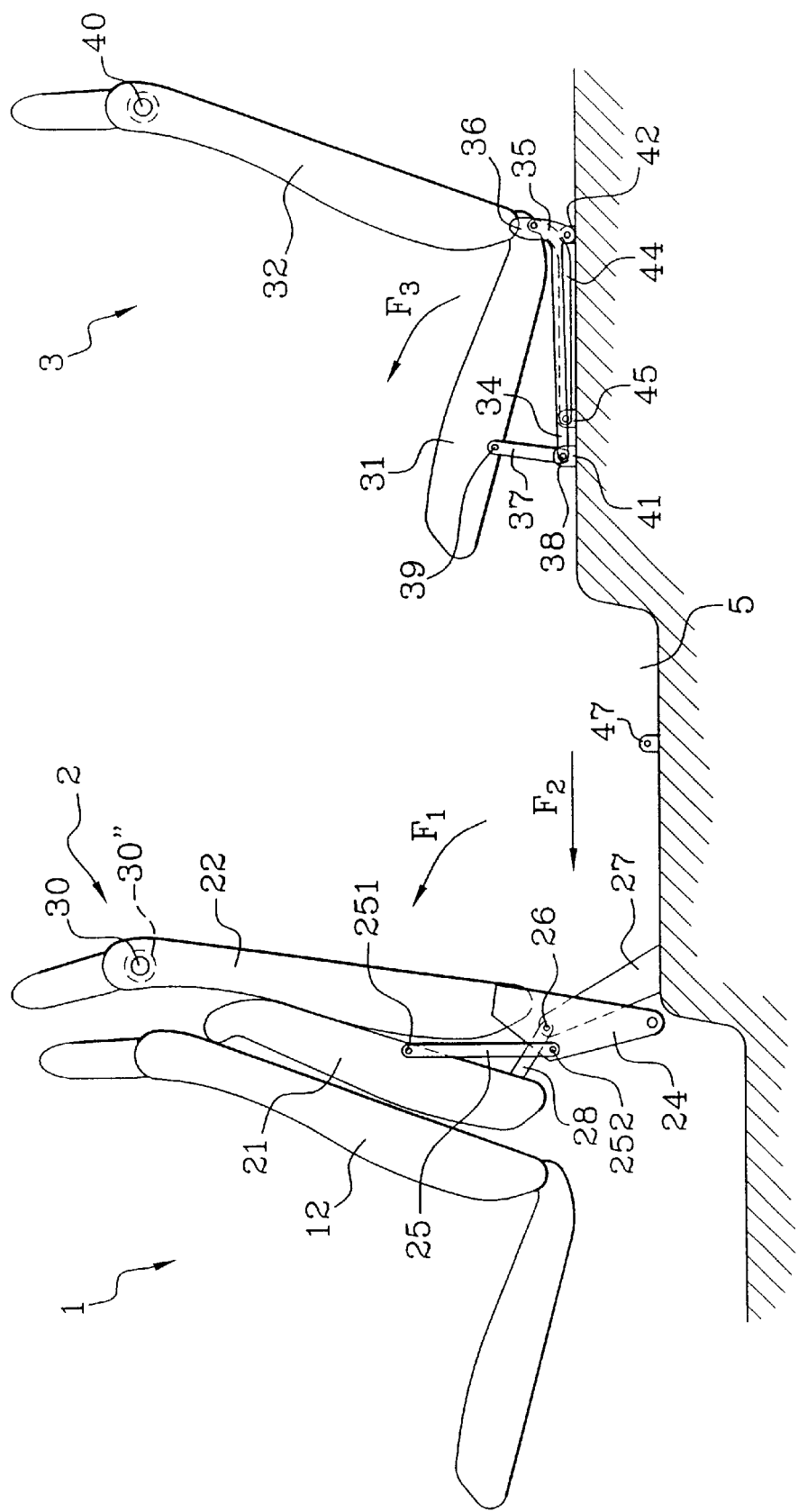
FIG. 2 is a view of the same seats in a first layout modification phase, where the seat of the second row is stowed and folded and placed against the seat of the first row.

The drawing on FIG. 1 shows a seat of first row 1, a seat of second row 2 and a seat of third row 3. Of course, each row conventionally includes several seats. Thus, the second row may have three seats abreast. All the seats are fixed, as will be seen later, to the floor 4 of the vehicle.

The seat of the third row 3 includes a seat pan 31 and a backrest 32 equipped with a headrest 33 preferentially retractable. The seat 3 is attached to the floor 4 of the vehicle by a first set of hinged items especially including a main arm 34 and a leg link 37. The main arm 34, which extends more or less horizontally in the normal utilization position of the seat, as can be seen on FIG. 1, includes at its rear end a head 35 which extends more or less vertically and on the top of which the backrest 32 is installed so as to pivot around an axis 36. The leg link 37 attaches the front end of the arm 34 to the seat pan 31 and comprises a front leg for the seat of the third row 3. The link 37 is installed so as to pivot both on the arm 34 around hinge axis 30 and on the seat pan 31 around hinge axis 39, located towards the front of the seat pan. The link between the seat and the floor 4 is ensured by disconnectable anchoring means, of a technology known itself, consisting of, for example:

towards the front, a front anchor fitting 41, attached to the floor 4 and which accommodates in a removable and lockable manner the hinge pin 38 or another attaching component attached to the lower end of the link 37 or to the front end of the arm 34, towards the rear, a rear anchor fitting 42, adapted to accommodate in a removable and lockable manner the lower end of the head 35.

A pivoting lever 44 attaches the arm 34 to the floor 4. A first end of the lever 44 is installed so as to pivot on a fork 45 attached to the floor 4, located between the fittings 41 and 42. The other end 46 (FIG. 3) of the lever 44 is hinged to the head 35 of the arm 34.

In the normal utilization position of the seat as shown on FIG. 1, the rear 310 of the seat pan 31 is connected to the bottom of the backrest or to the head 35 by lockable and unlockable attaching means, of a type known themselves, to prevent all movement of the seat pan in the forward-rearward direction. Means locking the link 37 in rotation combined simply with means to support the rear of the seat pan vertically could also be used for the same purpose.

Also, in the normal utilization position of the seat as shown on FIG. 1, the backrest 32 includes disconnectable locking means, symbolically represented by item 40, to lock the top of the backrest of the rear seat to the corresponding means 40' attached to the body of the vehicle. These locking means could also be replaced by an unlockable hinge system, not shown, ensuring, in a manner known itself, the connection between the backrest 32 and the arm 34 at level of pivoting axis 36.

The seat of the second row 2 includes a seat pan 21 and a backrest 22 equipped with a headrest 23. The seat 2 is connected to the floor 4 of the vehicle by a second set of hinged items especially including, at the rear, a rear leg 24 and a pivoting link 25. The backrest 22 is attached rigidly to the leg 24, and the connection to the floor is ensured by anchoring means including, for instance, an anchor fitting 47 attached to the floor and adapted to accommodate, in a removable and lockable manner, the lower end of the leg 24. As for the seat of the third row, the backrest 22 of the seat of the second row may include disconnectable locking means, symbolically represented by item 30 to lock the top of the backrest to the corresponding means 30' attached to the body of the vehicle or again an unlockable hinge system ensuring, in a manner known itself, the connection between the backrest and the leg 24.

At the front, the seat pan is installed so as to pivot around an axis 26 on a rigid seat pan support 27 attached to the floor 4 by means of a lug 28 rigidly attached to the seat pan, this lug being used to move the seat pan forwards when it is pivoted around axis 26, as will be seen later.

The pivoting link 25 is connected to the seat pan by a hinge point 251 and to the leg by a hinge point 252 so as to ensure a rigid connection in the forward-rearward direction between the seat pan 21 and the leg 24 when the seat 2 is in normal utilization position and so as to automatically move the backrest 22 forwards when the seat pan is pivoted forwards.

The rear of the seat pan is maintained, as for the seat 3 of the third row, by attaching means to the backrest or to the leg 24. Simple support means to vertically support the rear of the seat pan are sufficient for this seat as, by maintaining the rear of the seat pan against the bottom of the backrest, the seat pan can no longer pivot in relation to the backrest and the anchoring of the leg to the floor ensures that the seat is maintained in position.

The positions of the various hinge and anchoring points and the lengths of the arms and links are determined for each seat so as to allow the various movements which will now be explained in relation with FIGS. 2 to 6.

A location 5 is located under the seat pan of the seat of the second row 2 and intended to accommodate at least the seat pan of the seat of the third row 3.

From the utilization position of all seats shown on FIG. 1, the location 5 is disengaged by folding the seat of the second row against the backrest 12 of the seat of the first row 1. For this, after having released the locking means 30 and 30' at the top of the backrest and unlocked the leg 24 from its anchor fitting 47, the rear 210 of the seat pan is disengaged, by possibly aiding this disengagement by a slight pivoting of the backrest 22 towards the rear, then raised, causing the seat pan to pivot around axis 26, in the direction shown by arrow F1. The pivoting of the seat pan 21 is necessarily accompanied, due to the connection ensured by the link 25, by a translation movement of the backrest 22 forwards, in the direction shown by arrow F2, until the seat pan 21 is in raised position, shown on FIG. 2, against the rear of the backrest of the seat of the first row 12, and the backrest 22 is also in contact with the bottom face of the said seat pan 21. Additional locking means attached to the body, schematically represented by item 30'', are preferentially provided to hold the seat 2, at least temporarily, in this position.

Figure 3:
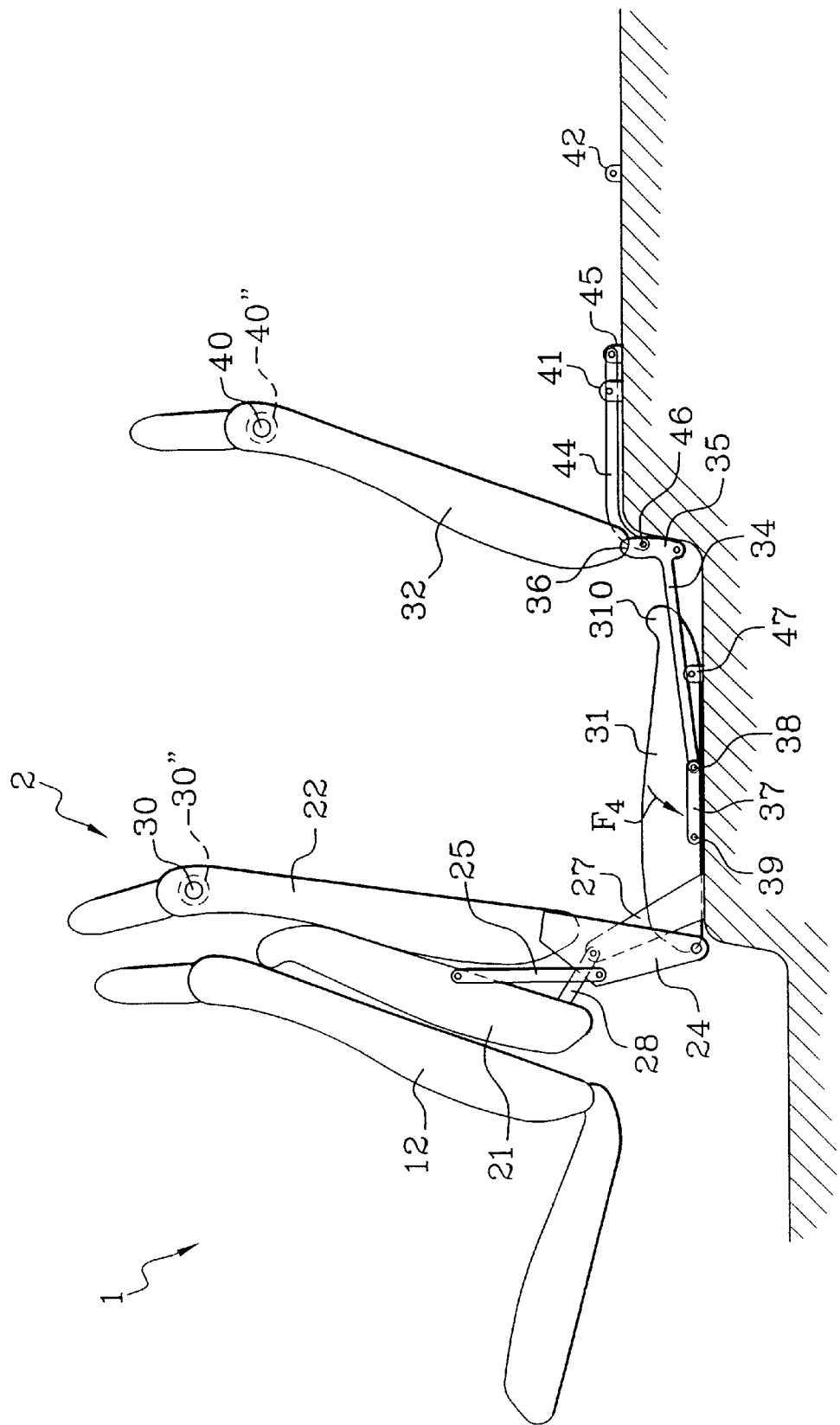
FIG. 3 is a view of the same seats in a second layout modification phase where the rear seat is in a forward position.

Then, the seat of the third row 3 is moved towards the front, in the forward position shown on FIG. 3. For this, after having released the locking means 40 and 40' of the top of the backrest, unlocked seat pan 31 to allow its movement towards the front, and released the anchors of arms 34 on the floor, the complete seat is raised and pivots, guided by the lever 44, around the pivot axis 45, as shown by arrow F3, the main arm 34 remaining more or less horizontal. At the end of the pivoting movement, the lever 44 is facing forwards, the arm 34 and the seat pan 31 being located at the location 5 made under the seat of the second row. Note that the end of lever 44, on arm 34 side, is elbowed in order to mate as closely as possible with the form of the step of floor 4. Also, the seat pan 31 rests directly on the floor subsequent to the pivoting forwards of the link 37 around axis 38, in the direction shown by arrow F4, the front edge of the seat pan 31 being housed between the two uprights forming the support of the front seat pan 27 of the seat of the second row 2.

Figure 4:
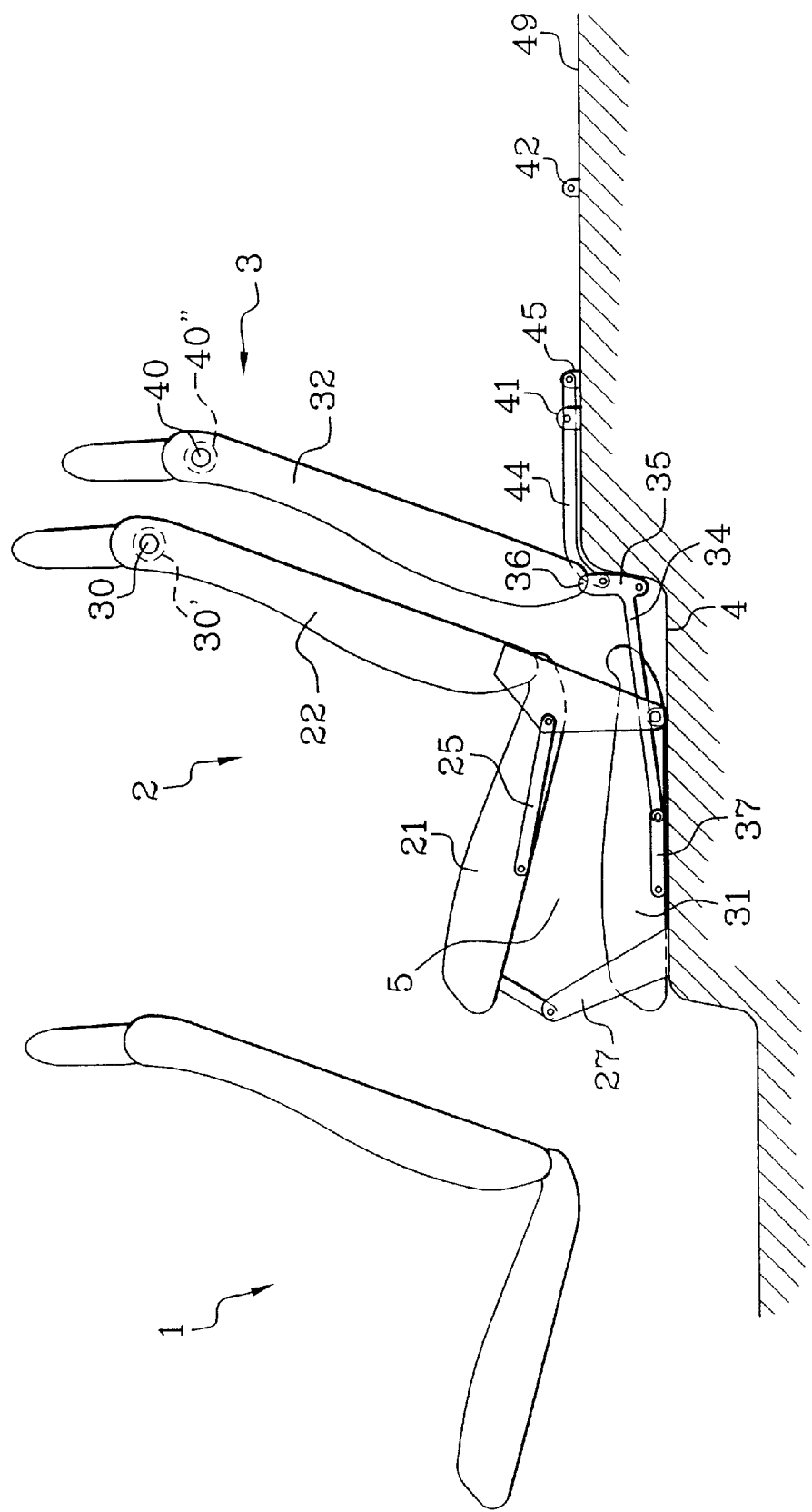
FIG. 4 is a view of the same seats in a first variant of the final layout where only the seat pan of the rear seat is located under the seat of the second row, the backrest of the rear seat being located behind the backrest of the seat of the second row.

From this position, the seat of the second row 2 can be placed in its utilization position, as shown on FIG. 4, by working back through the steps described above. In this case, the backrest 32 of the seat of the third row retains more or less its initial orientation but is placed just behind the backrest of the seat of the second row, retained by additional anchoring means 40" attached to the body, thus freeing all the space in the trunk and the floor surface where seat 3 was previously positioned.

Figure 5:
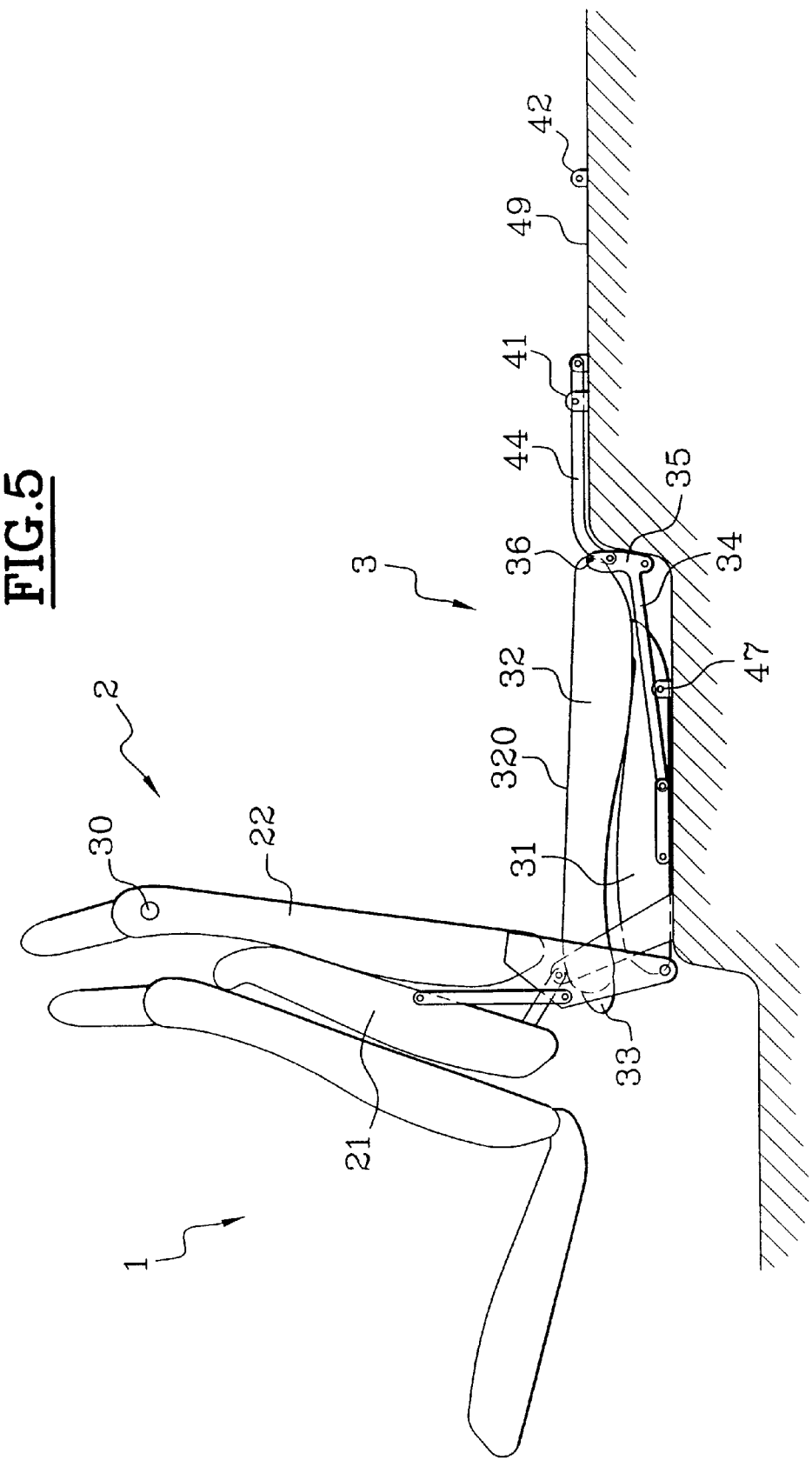
FIG. 5 is a view of the same seats in a second variant of the final layout where the seat of the second row is raised against the back of the seat of the first row to provide maximum trunk load-carrying space, the backrest of the rear seat being folded onto its seat pan and forming an extension to the floor of the trunk.

Also, as shown on FIG. 5, the backrest 32 of the seat of the third row can be folded down onto its seat pan 31, the rear face 320 of the backrest 32 then comprising an extension of the trunk load-carrying floor 49. This is made possible thanks to the break in alignment of the floor of the vehicle forming a sort of stairway rising from the first row of seats towards the trunk. The backrest is preferentially folded down before positioning the seat of the third row in its forward position, so that it will be easier to pass the top of the backrest 32 under the seat of the second row.

Lastly, from this last position, the seat of the second row can be brought into its service position as shown on FIG. 6. Note that the telescopic headrest 33 is pushed into the backrest 32 to free space between the seats of the first and second rows.

The invention is not limited to the design described above only as an example. In particular, the various hinged items and the hinging and anchoring means can be replaced by all means of known types enabling displacement kinematics to be ensured in compliance with the description above. Also, a layout as shown on FIG. 4, although possible to obtain in the shown hinged item configuration, will be more advantageous in the case of a space 5 more restricted under the seat of the second row 2 or to avoid a hinged link between the backrest 32 of the seat of the third row and the arm 34.

What is claimed is:

1. An automobile vehicle including a modular seat layout system, at least two seats located one behind the other and attachable to a vehicle floor, the system comprising:

a rear seat attached to the floor of the vehicle by a first linkage so that a seat pan of the rear seat can be translated forward to be housed, in a forward position, in a space provided for this purpose below the location which is occupied by a seat pan of the front seat in a normal utilization position of the front seat and wherein the front seat is attached to the floor of the vehicle by a second linkage arranged so that the front seat can be folded forward to allow the seat pan of the rear seat to be moved forward and then allow replacement of the front seat to its normal utilization position.

2. An automobile vehicle in accordance with claim 1, wherein, when the seat pan of the rear seat is in its forward position and the front seat is in its normal utilization position, the seat pan of the front seat is located above the seat pan of the forward moved rear seat, a backrest of the rear seat located just behind a backrest of the front seat and parallel thereto.

3. An automobile vehicle in accordance with claim 1, wherein a backrest of the rear seat is installed so as to pivot in relation to the seat pan of the rear seat so that when the seat pan of the rear seat is moved to a forward position, and the front seat is folded away and move forward, the backrest of the rear seat can be brought into a position where it is folded onto the seat pan of the rear seat, below the location which is occupied by the seat pan of the front seat in the normal utilization position of the said front seat.

4. An automobile vehicle in accordance with claim 3, wherein, in the position where the backrest of the rear seat is folded onto the seat pan of the rear seat in a forward position, a rear face of the rear backrest is in line with and extends a load-carrying surface of a trunk of the vehicle.

5. An automobile vehicle in accordance with claim 1, wherein the second linkage is arranged so that the seat pan of the front seat can be raised to a vertical position by pivoting the front seat pan forwards and a backrest of the front seat can be translated to place it behind the raised front seat pan.

6. An automobile vehicle in accordance with claim 5, wherein the second linkage includes:

a front seat pan support fixed and attached to the floor on which the front of the seat pan of the front seat is hinged;

a rear leg the upper end of which accommodates the backrest of the front seat which is attached to the seat pan of the front seat by a pivoting link hinged to the leg and to the seat pan in a longitudinal center section of the seat pan.

7. An automobile vehicle in accordance with claim 6, further comprising disconnectable anchoring means to connect in a separable manner the lower end of the rear leg to the floor of the vehicle.

8. An automobile vehicle in accordance with claim 1, wherein the first linkage comprises:

a main arm which extends horizontally and which has a rear end forming a head on which a backrest is installed, and a front end is attached to the seat pan of the rear seat by a leg link hinged in relation to the arm and in relation to the seat pan of the rear seat; and a pivoting lever the first end of which is hinged to the floor of the vehicle and the second end of which is hinged to the head of the main arm.

9. An automobile vehicle in accordance with claim 8, further comprising a disconnectable anchoring means to attach in a separable manner the two ends of the main arm to the floor of the vehicle.

10. An automobile vehicle in accordance with claim 8, wherein the backrest of the rear seat is installed so as to pivot on the head of the main arm, and the system includes disconnectable locking means to connect the top of the backrest of the rear seat to the body of the vehicle.

11. Automobile vehicle including at least two seats located one behind the other, wherein a rear seat is attached to a floor of the vehicle by a first linkage so that a seat pan of the rear seat can be translated towards the front of the vehicle, to be housed, in a forward position, in a space provided for this purpose below a location which is occupied by a seat pan of a front seat in a normal utilization position of the front seat and whereby the front seat can be folded away towards the front to allow the seat pan of the rear seat to be placed in its said forward position and then replace the front seat in its normal utilization position.

\* \* \* \* \*